(12) United States Patent
Cammarata et al.

(10) Patent No.: US 7,657,715 B2
(45) Date of Patent: Feb. 2, 2010

(54) DYNAMIC OPERATION MODE TRANSITION OF A STORAGE SUBSYSTEM

(75) Inventors: James B. Cammarata, La Grange Park, IL (US); Scott B. Compton, Hyde Park, NY (US); Craig D. Norberg, Beacon, NY (US); Dale F. Riedy, Jr., Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/555,088

(22) Filed: Oct. 31, 2006

(65) Prior Publication Data

US 2008/0104354 A1  May 1, 2008

(51) Int. Cl.
*G06F 12/00* (2006.01)
(52) U.S. Cl. .............. 711/154; 711/100; 711/111; 711/112; 711/113; 711/114; 711/115; 711/156; 713/1; 713/2; 710/8; 710/9; 710/10; 710/104; 710/300; 710/301; 710/302
(58) Field of Classification Search .......... 711/100, 711/111–115, 154, 156; 713/1–2; 710/8–10, 710/300–302, 104
See application file for complete search history.

(56) References Cited

U.S. PATENT DOCUMENTS

| | | | |
|---|---|---|---|
| 5,257,368 A * | 10/1993 | Benson et al. ............... | 707/1 |
| 6,253,260 B1 | 6/2001 | Beardsley et al. | |
| 6,587,938 B1 | 7/2003 | Eilert et al. | |
| 6,622,177 B1 | 9/2003 | Eilert et al. | |
| 6,877,045 B2 | 4/2005 | Goode et al. | |
| 6,973,586 B2 | 12/2005 | Petersen et al. | |
| 2004/0107302 A1 | 6/2004 | Vishlitzky et al. | |
| 2004/0230783 A1* | 11/2004 | Brice et al. ............... | 713/1 |
| 2005/0027719 A1 | 2/2005 | Maciel et al. | |
| 2005/0114591 A1 | 5/2005 | Coronado et al. | |
| 2006/0020944 A1 | 1/2006 | King et al. | |

OTHER PUBLICATIONS

Merritt et al., "z/Os Support for the IBM TotalStorage Enterprise Storage Server", IBM Systems Journal, vol. 42, No. 2, 2003, pp. 280-301.
Hartung et al., "IBM TotalStorage Enterprise Storage Server: A Designer's View", IBM Systems Journal, vol. 42, No. 2, 2003, pp. 383-396.

* cited by examiner

*Primary Examiner*—Tuan V Thai
*Assistant Examiner*—Zhuo H Li
(74) *Attorney, Agent, or Firm*—Rabindranath Dutta; Konrad Raynes & Victor LLP

(57) ABSTRACT

A host implement a method for controlling a dynamic transition of the host from a current operation mode to a target operation mode. The method involves the host receiving an operation mode transition request to transition a logical representation of a storage subsystem as maintained by the host from the current operation mode to the target operation mode, and the host reconfiguring the logical representation of the storage subsystem to the target operation mode based on the operation mode transition request exclusive of a re-IPLing of an operating system of the host.

18 Claims, 7 Drawing Sheets

DYNAMIC OPERATION MODE TRANSITION OF A STORAGE SUBSYSTEM

FIELD OF THE INVENTION

The present invention generally relates to logical representations by a host of storage subsystems based on a current operation mode. The present invention specifically relates to a dynamic transition by the host of the logical representations of storage subsystems from a current operation mode to a target operation mode.

BACKGROUND OF THE INVENTION

FIG. 1 illustrates a plurality of host 10 (e.g., mainframes, a personal computers, or a workstations) connected to a storage subsystem 20, which in turn is connected to a storage subsystem 40, and connected to a storage subsystem 30, which in turn is connected to a storage subsystem 50 (e.g., storage systems may be automated media libraries). Each host 10 employs an operating system 11 (e.g., a IBM MVS operating system) and a storage manager 12 whereby operating system 11 initializes an initial operation mode of storage manager 12 in controlling I/O operations to a parallel access volume ("PAV") of base logical volume(s) 21 and logical alias(es) 22 residing on storage subsystem 20, to a PAV of base logical volume(s) 31 and a logical alias(es) 32 residing on storage subsystem 30, to a PAV of a base logical volume(s) 41 and a logical alias(es) 42 residing on storage subsystem 40, and to a PAV of a base logical volume(s) 51 and a logical alias(es) 52 residing on storage subsystem 50.

Currently, a reconfiguration of each host 10 from an initial operation mode (e.g., a base PAV operation mode) to a new target operation mode (e.g., a HyperPAV operation mode) requires a re-IPLing of operating system 11 (e.g., a reloading of initial programs by operating system 11), which is impractical for a twenty-four (24) hours a day/seven (7) days a week/twelve (12) months a year host access of storage subsystems 20, 30, 40, 50. Thus, there is a need for a technique for reconfiguring host 10 to a new target operation mode exclusive of a re-IPLing of operating system 11.

SUMMARY OF THE INVENTION

The present invention provides a new and unique dynamic operation mode manager for a dynamic transition of a host from a current operation mode to a target operation mode exclusive of a re-IPLing of an operating system of the host, which is broadly defined for purposes of the present invention as any host activity responsive to a host application downtime or outage including, but not limited to, a reloading of the host operating system for any reason and a reinitializing of a host view of an offline device coming back online.

One form of the present invention is a computer readable medium tangibly embodying a program of machine-readable instructions executable by a processor to perform operations for a host controlling a dynamic transition of the host from a current operation mode to a target operation mode. The operations comprise the host receiving an operation mode transition request to transition a logical representation of a storage subsystem as maintained by the host from the current operation mode to the target operation mode, and the host reconfiguring the logical representation of the storage subsystem to the target operation mode based on the operation mode transition request exclusive of a re-IPLing of an operating system of the host.

A second form of the present invention is a host comprising a processor, and a memory storing instructions operable with the processor for a host controlling a dynamic transition of the host from a current operation mode to a target operation mode. The instructions are executed for the host to receive an operation mode transition request to transition a logical representation of a storage subsystem as maintained by the host from the current operation mode to the target operation mode, and for the host to reconfigure the logical representation of the storage subsystem to the target operation mode based on the operation mode transition request exclusive of a re-IPLing of an operating system of the host.

A third form of the present invention is a method for a host controlling a dynamic transition of the host from a current operation mode to a target operation mode. The method involves the host receiving an operation mode transition request to transition a logical representation of a storage subsystem as maintained by the host from the current operation mode to the target operation mode, and the host reconfiguring the logical representation of the storage subsystem to the target operation mode based on the operation mode transition request exclusive of a re-IPLing of an operating system of the host.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
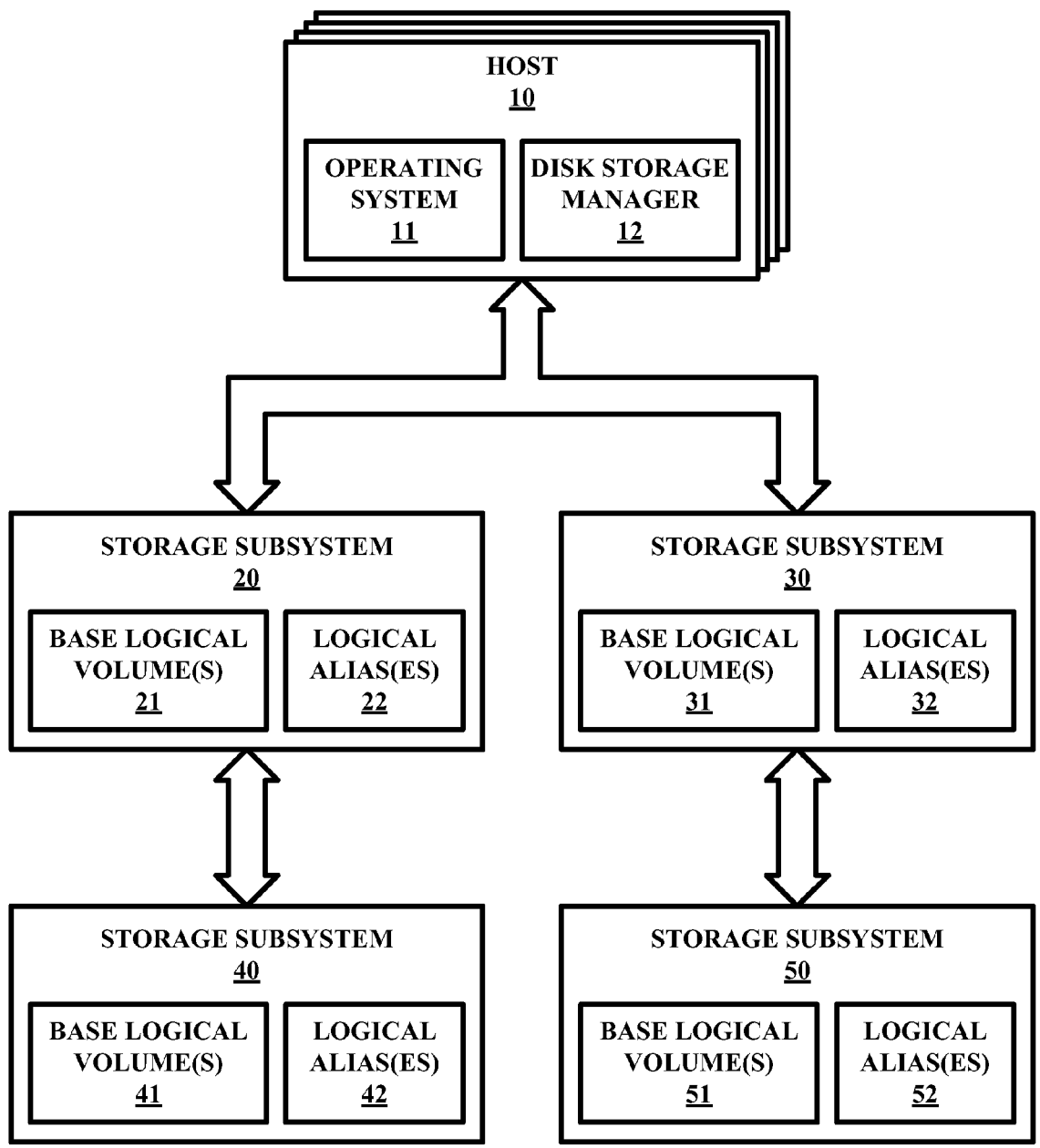
FIG. 1 illustrates an exemplary storage environment as known in the art.
Figure 2:
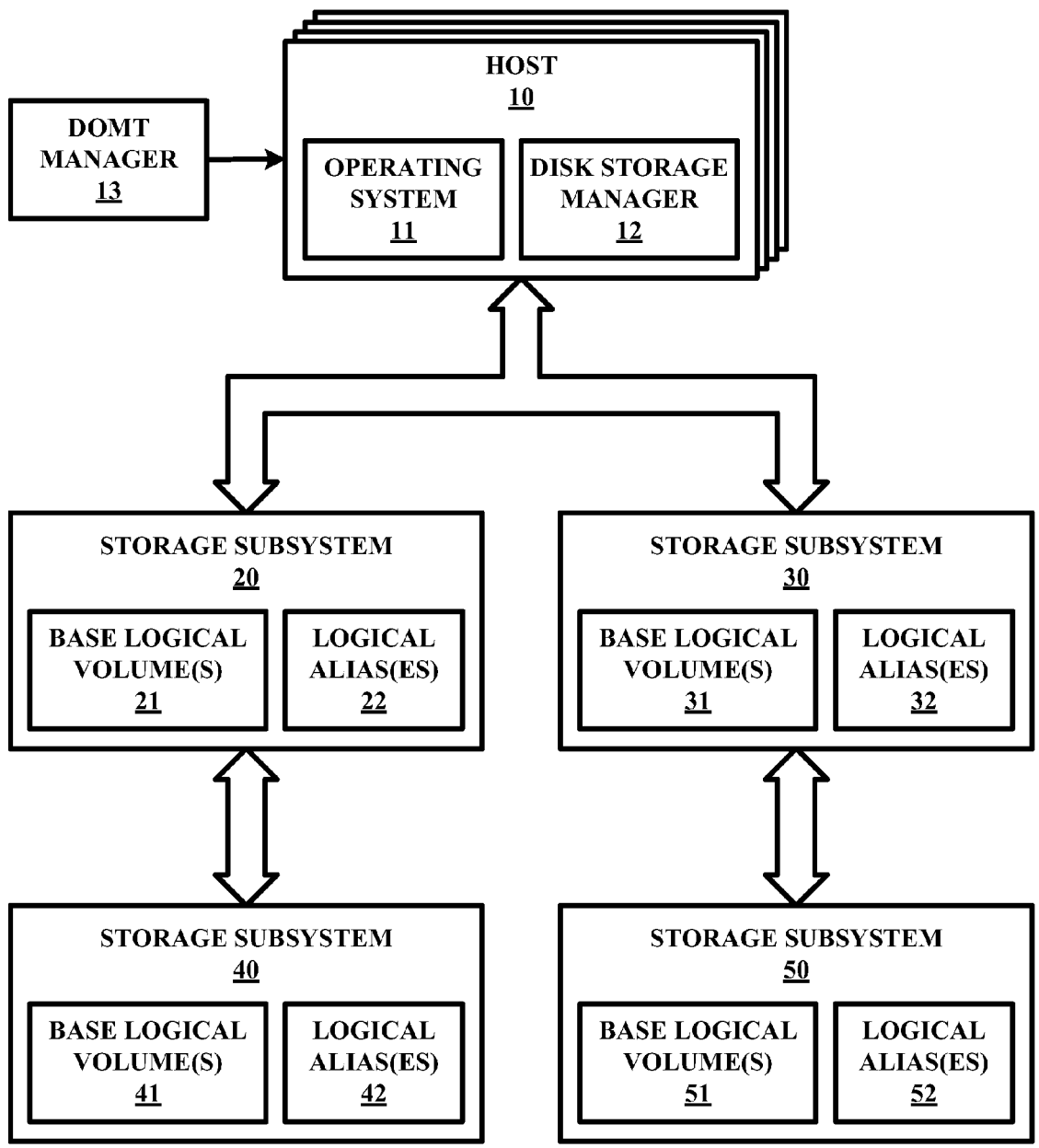
FIG. 2 illustrates one embodiment of a storage environment in accordance with the present invention.
Figure 3:
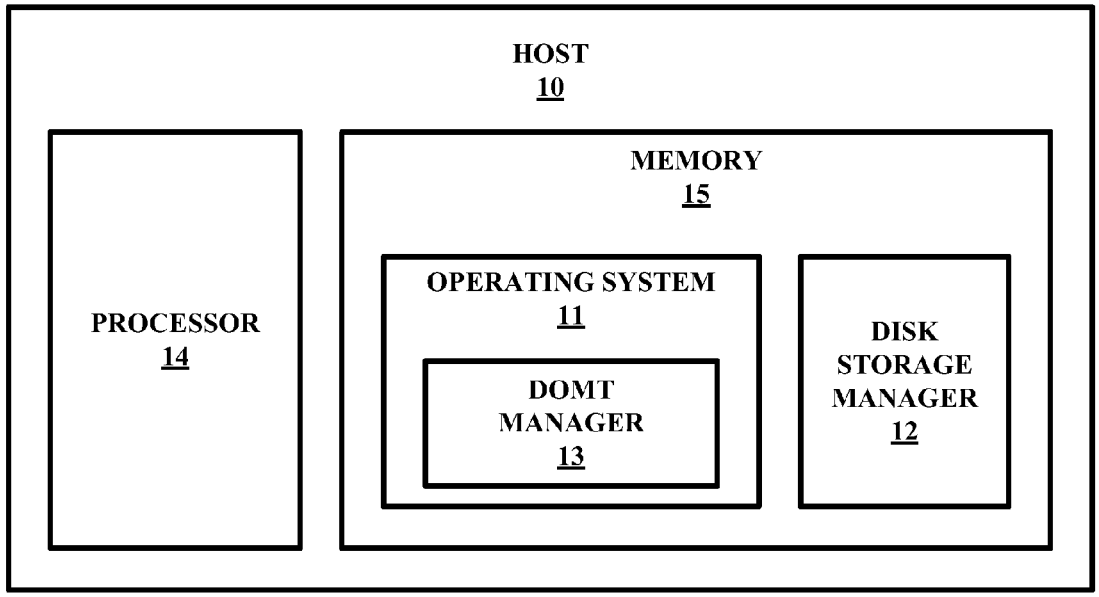
FIG. 3 illustrates one embodiment of a host in accordance with the present invention.
Figure 4:
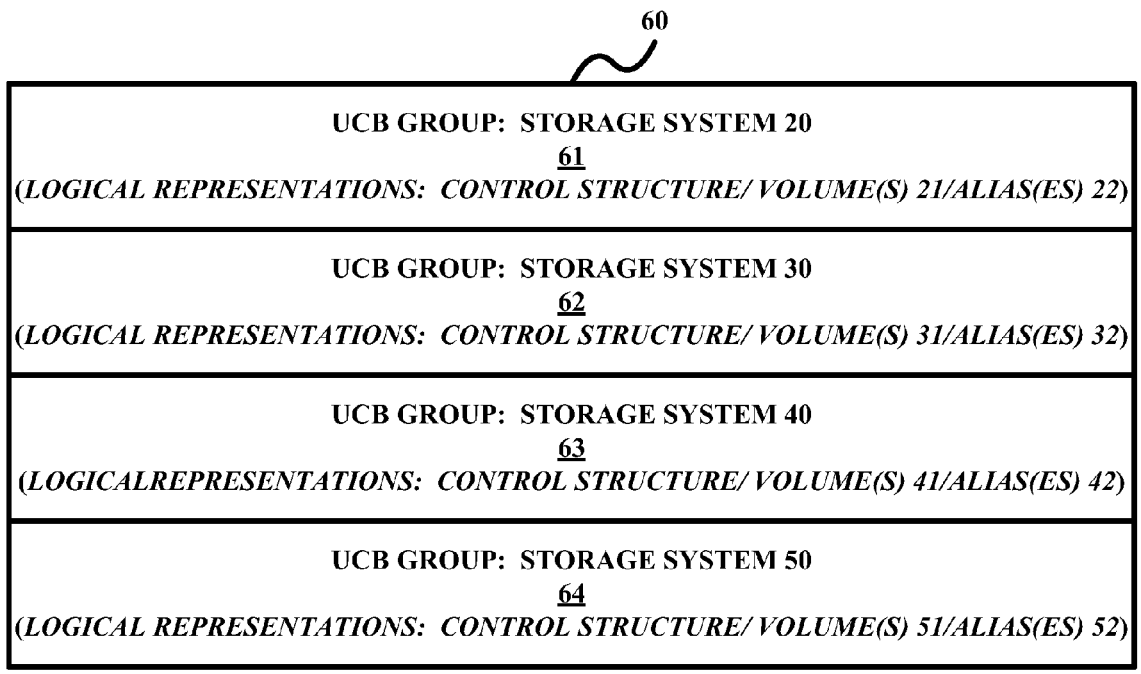
FIG. 4 illustrates one embodiment of a control block in accordance with the present invention.

FIG. 2 illustrates a dynamic operation mode transition ("DOMT") manager 13 installed on each host 10. DOMT manager 13 is structurally configured with software, hardware and/or firmware to implement a dynamic operation mode transition of each host 10 as needed in the context of storage subsystems 20, 30, 40, 50 (e.g., an online operation mode transition by a host 10 that is transparent to storage subsystems 20, 30, 40, 50). In one embodiment, as shown in FIG. 3, a host 10 employs a processor 14 and a memory 15 for supporting operating system 11 having DOMT manager 13 integrated therein, and for supporting storage manager 12. Generally, in dynamically transitioning the operation mode of host 10, DOMT manager 13 implements an operation mode transition method of the present invention represented by a flowchart 70 illustrated in FIG. 5 as a function of a memory block 60 of universal control block ("UCB") groups 61-64 associated with respective storage subsystems 20, 30, 40, 50 as shown in FIG. 4. Each UCB group 61-64 encompasses separate logical representations of the control structure of the associated storage subsystem as well as the base volume(s) and the logical alias(es) (e.g., sixty-four base volumes and 192 logical aliases per storage subsystem. Such logical representations describe pertinent information related to the architecture of the associated storage subsystem including, but not limited to, configuration data and device characteristics.

Figure 5:
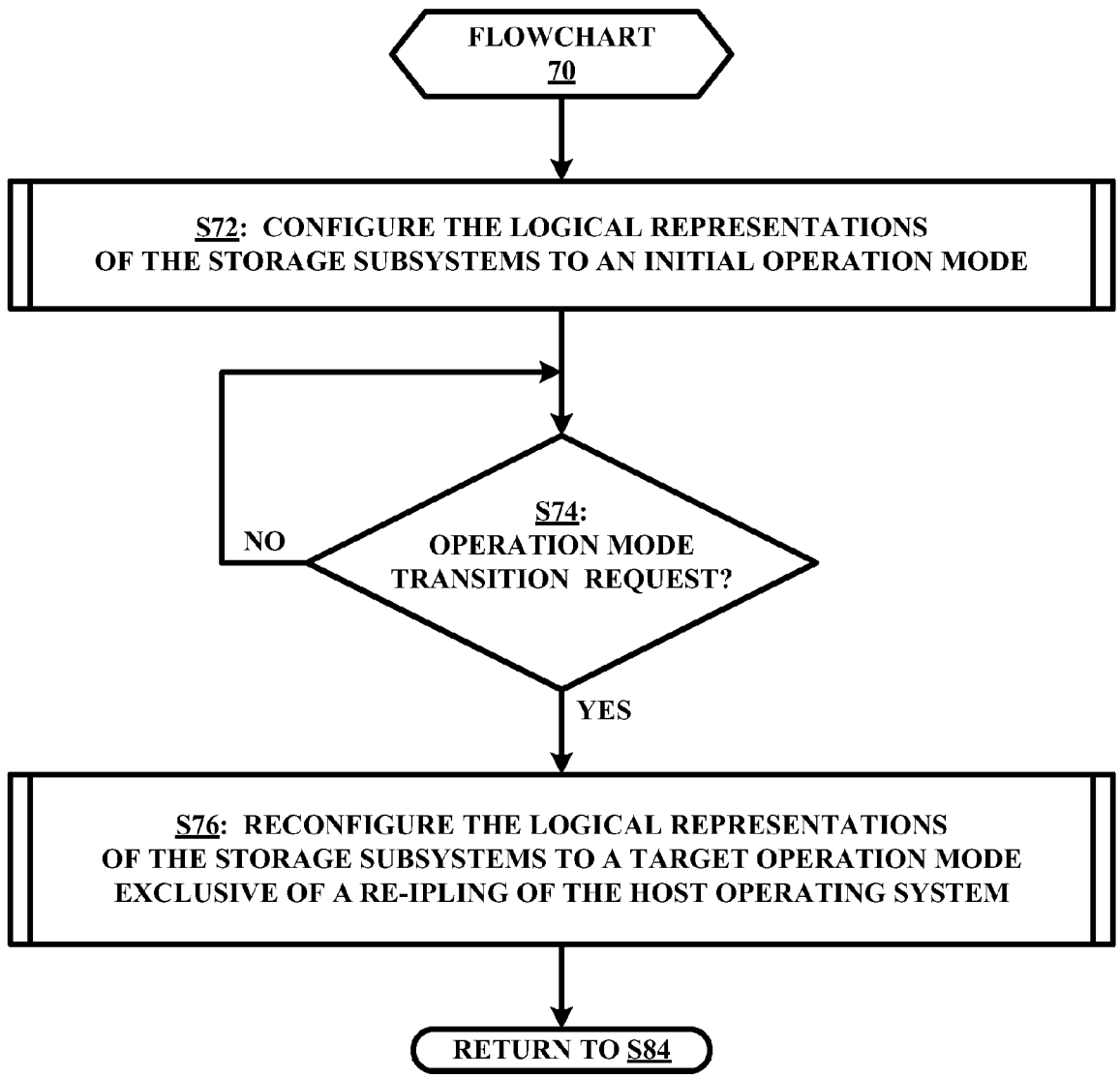
FIG. 5 illustrates a flowchart representative of one embodiment of a host operation mode transition method in accordance with the present invention.

Referring to FIG. 5, a stage S72 of flowchart 70 encompasses DOMT manager 13 configuring logical representations of storage subsystems 20, 30, 40, 50 to an initial operation mode (e.g., a base PAV operation mode) including, but not limited to, establishing the initial mode of operation and building UCB blocks 61-64. Stage S72 is part of an overall initializing of host 10 and upon host 10 coming online, DOMT manager 13 proceeds to a stage S74 of flowchart 70 to await an operation mode transition ("OMT") request to transition host 10 from the initial operation mode (i.e., a current operation mode) to a target operation mode (e.g., a HyperPAV operation mode). For purposes of the present invention, the term "operation mode transition request" is broadly defined herein as a request received by DOMT manager 13 to discretionarily transition host 10 from the current operation mode to the target operation mode based on the operational capabilities of host 10 and storage subsystems 20, 30, 40, 50 and exclusive of a re-IPLing of operating system 11. In practice, the OMT request can be provided by an operator of host 10 or one of the storage subsystems 20, 30, 40, 50.

Upon receiving an OMT request, DOMT manager 13 proceeds to a stage S76 of flowchart 70 to determine whether host 10 is capable of operating in the target operation mode irrespective of the source of the request. For purposes of the present invention, a determination by host 10 that host 10 is capable of operating in the target operation mode broadly encompasses host having the capability of operating in the target operation mode or a comparable operation mode from the perspective of storage subsystems 20, 30, 40, 50.

If the source of the OMT request is a host operator, then DOMT manager 13 additionally determines during stage S76 whether each storage subsystem of storage subsystems 20, 30, 40, 50 affected by the OMT request is capable of operating in the target operation mode. Those having ordinary skill in the art will appreciate that DOMT manager 13 performs such a determination based on a specific architecture of the affected storage subsystems 20, 30, 40, 50. Nonetheless, DOMT manager 13 will generally request and interpret information descriptive of the affected storage subsystems 20, 30, 40, 50 to thereby update its logical representations of the affected storage subsystems 20, 30, 40, 50 as needed.

To facilitate a more specific understanding of the operation mode transition method of the present invention, DOMT manager 13 will now be described herein in the context of implementing a host operation mode transition method of the present invention represented by a flowchart 80 shown in FIG. 6.

Figure 6:
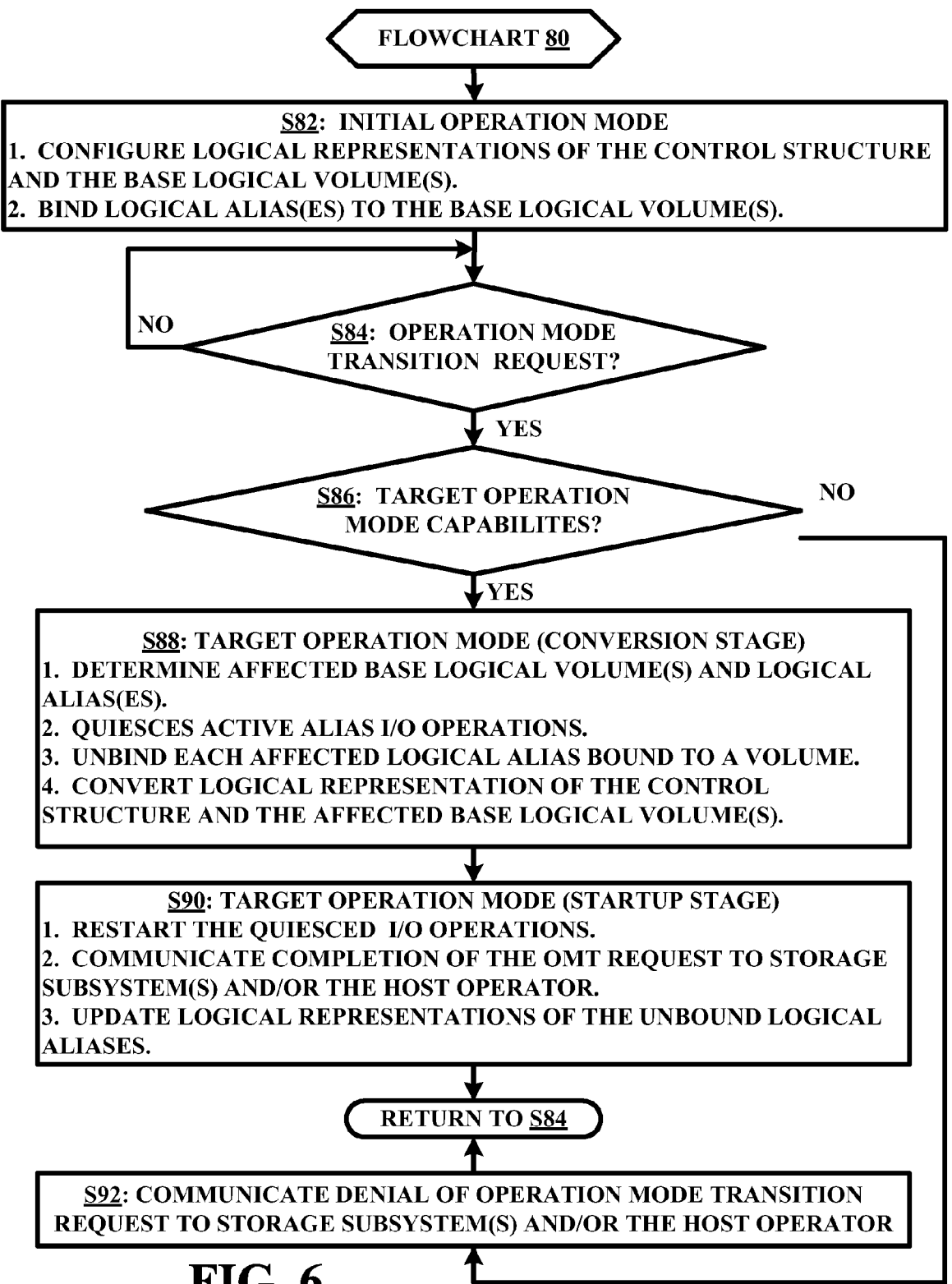
FIG. 6 illustrates a flowchart representative of one embodiment of the host operation mode transition method illustrated in FIG. 5 in accordance with the present invention.

Referring to FIG. 6, a stage S82 of flowchart 80 encompasses DOMT manager 13 configuring logical representations of a control structure and each base logical volume of storage subsystems 20, 30, 40, 50 to an initial operation mode (e.g., a base PAV operation mode). Stage S82 of flowchart 80 further encompasses DOMT manager 13 binding each logical alias of storage subsystems 20, 30, 40, 50, such as, for example, as taught in U.S. Pat. Nos. 6,167,459; 6,662,177; and 6,973,586.

Stage S82 is part of an overall initializing of host 10 and upon host 10 coming online, DOMT manager 13 proceeds to a stage S84 of flowchart 80 to await an OMT request to transition host 10 from the initial operation mode (i.e., a current operation mode) to a target operation mode (e.g., a HyperPAV operation mode). Upon receiving an OMT request, DOMT manager 13 proceeds to a stage S86 of flowchart 80 to ascertain whether host 10 is capable of operating in the target operation mode irrespective of the source of the request, and additionally ascertaining whether each affected storage subsystems of storage subsystems 20, 30, 40, 50 is capable of operating in the target operation mode if the source of the request is a host.

As previously stated herein, the OMT request may be communicated to host 10 by a host operator. For this case, stages S94 and S96 are implemented by a host operator operation mode transition request method of the present invention as represented by a flowchart 100 shown in FIG. 7.

Figure 7:
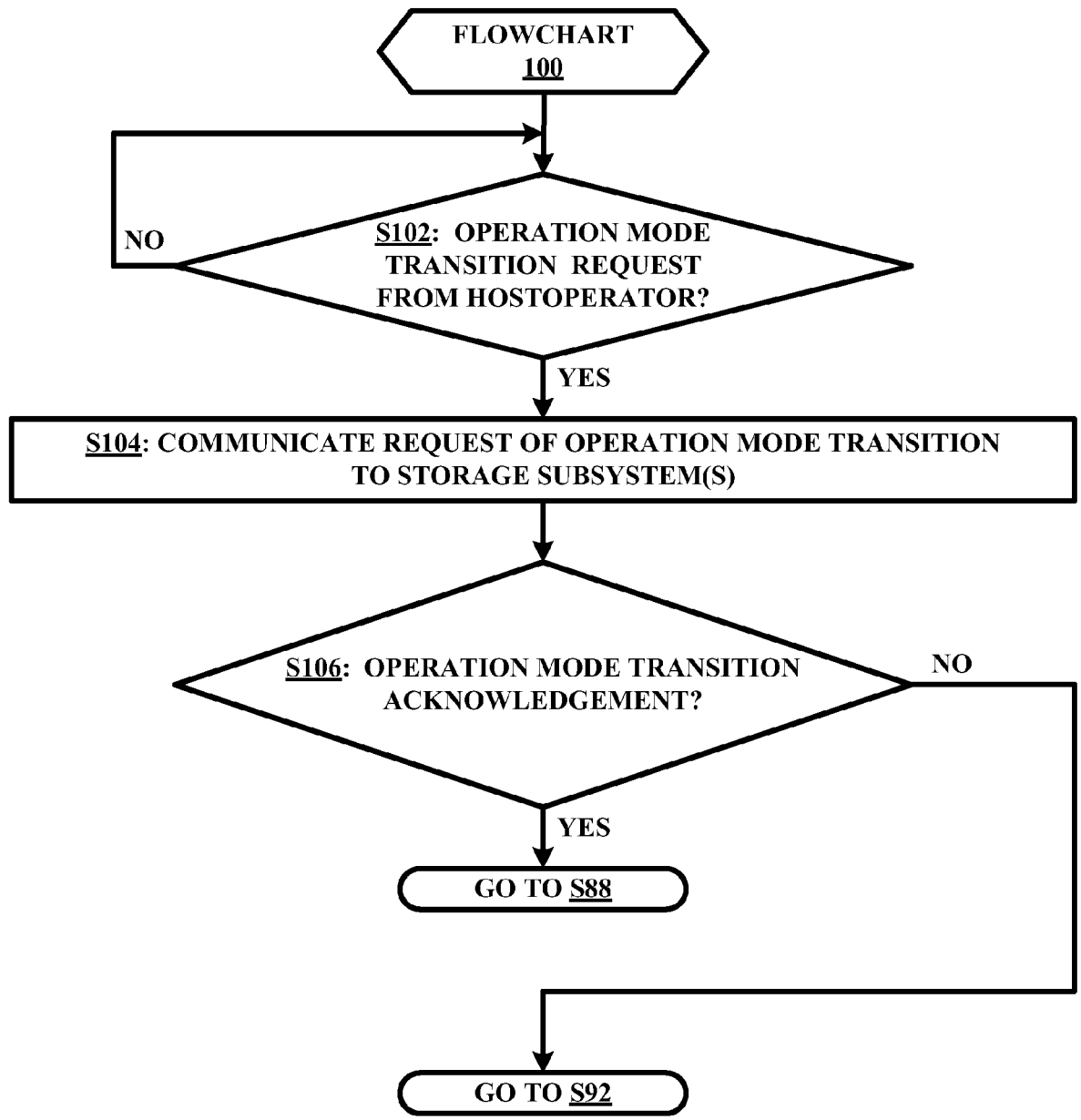
FIG. 7 illustrates a flowchart representative of one embodiment of a host operator operation mode transition request method in accordance with the present invention.

Referring to FIG. 7, a stage S102 of flowchart 100 encompasses DOMT manager 13 passively awaiting OMT request from the host operator, and upon receiving such a request, DOMT manager 13 proceeds to a stage S 104 of flowchart 100 to communicate the OMT request to each affected storage subsystem of storage subsystems 20, 30, 40, 50. In one embodiment of stage S104, DOMT manager 13 provides the OMT request to the each affected storage subsystem based on the logical representation(s) of its base logical volume(s).

Thereafter, DOMT manager 13 proceeds to a stage S106 of flowchart 100 to await an acknowledgment of the OMT request by each affected storage subsystem. A receipt of the acknowledgment during stage S 106 is deemed by DOMT manager 13 to indicate the acknowledging storage subsystem is capable and ready to operate in the target operation mode. In response thereto, DOMT manager 13 therefore proceeds to a stage S88 of flowchart 80 to (1) determine each affected base logical volume and logical alias, (2) quiesces I/O operations of each affected logical alias by cancelling and requeuing such I/O operations, (3) unbind each affected logical alias bound to a base logical volume, and (4) convert the logical representations of the control structure and the affected based logical volume(s) of the acknowledging storage subsystem to the target operation mode. Thereafter, during a stage S90 of flowchart 80, DOMT manager 13 performs (1) a restart of the quiesced alias I/O operations, (2) a communication of a completion of the OMT request to the acknowledging storage subsystem and the host operator, and (3) an update of the logical representation of each unbound logical alias including, but not limited to, binding or pooling each of the logical aliases as needed.

Stages S88 and S90 eliminate a need to re-IPL operating system 11 of host 10 during a transition of host 10 from the current operation mode to the target operation mode.

Referring again to FIG. 7, a failure to receive the acknowledgment during stage S 106 is deemed by DOMT manager 13 to indicate a storage subsystem is incapable of operating in the target operation mode. In response thereto, DOMT manager 13 proceeds to a stage S92 of flowchart 80 to communicates a denial of the OMT request to the host operator.

Alternatively, as previously stated herein, the OMT request may be communicated to host 10 by one of the storage subsystems 20, 30, 40, 50. For this case, stages S94 and S96 are implemented by a storage subsystem operation mode transition request method of the present invention as represented by a flowchart 110 shown in FIG. 8.

Figure 8:
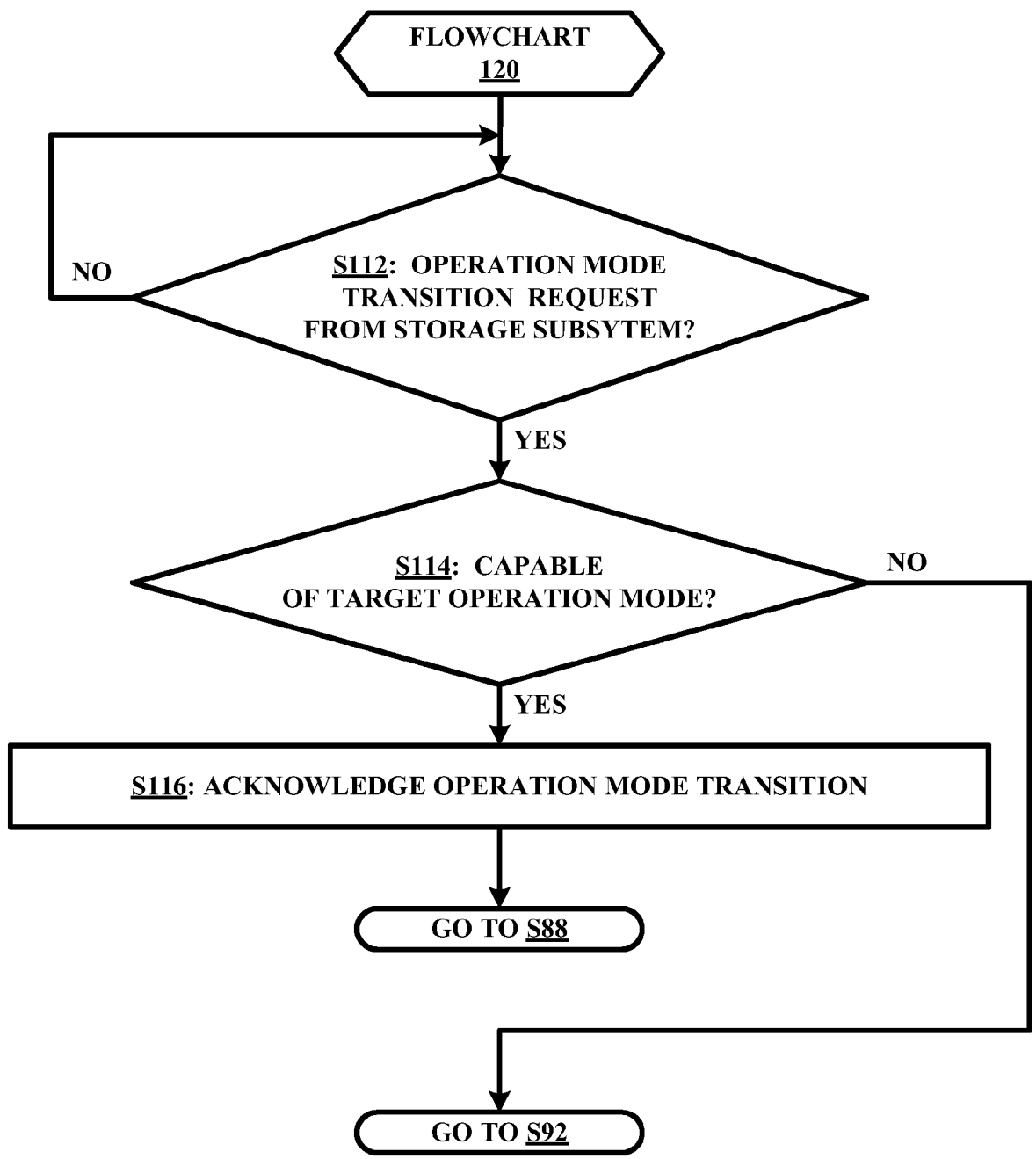
FIG. 8 illustrates a flowchart representative of one embodiment of a storage subsystem operation mode transition request method in accordance with the present invention.

Referring to FIG. 8, a stage S112 of flowchart 110 encompasses DOMT manager 13 passively awaiting an OMT request from one of the storage subsystems 20, 30, 40, 50, and upon receiving such a request, DOMT manager 13 proceeds to a stage S 14 of flowchart 110 to determine if host 10 is capable of operating in the target operation mode. If host 10 is capable of operating in the target operation mode, then DOMT manager 13 acknowledges the OMT request to the requesting storage subsystem during a stage S116 of flowchart 110 and proceeds to stage S88 of flowchart 80 to (1) determine each affected base logical volume and logical alias, (2) quiesces I/O operations of each affected logical alias by cancelling and requeuing such I/O operations, (3) unbind each affected logical alias bound to a base logical volume, and (4) convert the logical representations of the control structure and the affected base logical volume(s) of the requesting storage subsystem to the target operation mode. Thereafter, during stage S90, DOMT manager 13 performs (1) a restart of the quiesced alias I/O operations, (2) a communication of a completion of the OMT request to the requesting storage subsystem and the host operator (if needed), and (3) an update of the logical representation of each unbound logical alias including, but not limited to, binding or pooling each of the logical aliases as needed.

Again, stages S88 and S90 eliminate a need to re-IPL operating system 11 of host 10 during a transition of host 10 from the current operation mode to the target operation mode.

If host 10 is incapable of operating in the target operation mode, DOMT manager 13 proceeds to stage S92 to communicate a denial of the OMT request to the requesting storage subsystem 20, 30, 40, 50.

Referring to FIGS. 2-8, those having ordinary skill in the art will appreciate that an application of the inventive principles of the present invention is highly dependent upon an architecture of each storage subsystem. Nonetheless, those having ordinary skill in the art will further appreciate how to apply the inventive principles of the present invention to storage environments more or less complex than the storage environment shown in FIG. 2, particularly in view of (1) a host being able to set the operation modes of the storage subsystems, (2) each storage system being able to communicate its capabilities to the host, (3) each storage system being able to communicate any internal changes to the host, and (4) a host being able to implement or mimic a target operation mode from the perspective of each storage subsystem.

Still referring to FIGS. 2-8, the present invention was described in the context of storage subsystems employing devices in the base logical volumes and logical aliases in order to provide a basic understanding of the present invention. However, those having ordinary skill in the art will appreciate how to apply the inventive principles of the present invention to other devices of a storage subsystem, such as, for example, a printer.

The term "processor" as used herein is broadly defined as one or more processing units of any type for performing all arithmetic and logical operations and for decoding and executing all instructions related to facilitating an implementation by hosts of the various methods of the present invention. Additionally, the term "memory" as used herein is broadly defined as encompassing all storage space in the form of signal readable mediums of any type within hosts.

Furthermore, those having ordinary skill in the art of storage subsystem may develop other embodiments of the present invention in view of the inventive principles of the present invention described herein. Thus, the terms and expression which have been employed in the foregoing specification are used herein as terms of description and not of limitations, and there is no intention in the use of such terms and expressions of excluding equivalents of the features shown and described or portions thereof, it being recognized that the scope of the present invention is defined and limited only by the claims which follow.

We claim:

1. A computer readable medium tangibly embodying a program of machine-readable instructions executable by a processor to perform operations for a host controlling a dynamic transition of the host from a current operation mode to a target operation mode, the operations comprising:
   the host receiving an operation mode transition request to transition a logical representation of a storage subsystem as maintained by the host from the current operation mode to the target operation mode; and
   the host reconfiguring the logical representation of the storage subsystem to the target operation mode based on the operation mode transition request exclusive of a reloading of initial programs by an operating system of the host,
   wherein the host reconfiguring the logical representation of the storage subsystem to the target operation mode based on the operation mode transition request includes:
      the host quiescing each active alias I/O operation; and
   wherein the operations further comprise:
      the host restarting each quiesced alias I/O operation subsequent to a completion of a reconfiguration of the logical representation of the storage subsystem to the target operation mode.

2. The computer readable medium of claim 1,
   wherein the host receives the operation mode transition request from an operator of the host; and
   wherein the host reconfiguring the logical representation of the storage subsystem to the target operation mode based on the operation mode transition request includes:
      the host communicating the operation mode transition request from the host to the storage subsystem; and
      the host reconfiguring the logical representation of the storage subsystem to the target operation mode in response to an acknowledgement of the operation mode transition request by the storage subsystem.

3. The computer readable medium of claim 1,
   wherein the host receives the operation mode transition request from the storage subsystem; and
   wherein the host reconfiguring the logical representation of the storage subsystem to the target operation mode based on the operation mode transition request further includes:
      the host acknowledging the operation mode transition request from the storage subsystem in response to the on the host having a capability of operating in the target mode operation.

4. The computer readable medium of claim 1, wherein the host reconfiguring the logical representation of the storage subsystem to the target operation mode based on the operation mode transition request includes:
   the host unbinding each logical alias bounded to a base logical volume and affected by an execution of the operation mode transition request.

5. The computer readable medium of claim 4, wherein the operations further comprise:
   the host updating a logical representation of each unbound logical alias subsequent to a completion of a reconfiguration of the logical representation of the storage subsystem to the target operation mode.

6. The computer readable medium of claim 1, wherein the host reconfiguring the logical representation of the storage subsystem to the target operation mode based on the operation mode transition request includes:

the host converting logical representations of a control structure of the storage subsystems and each base logical volume of the storage subsystem affected by an execution of the operation mode transition request from the current operation mode to the target operation mode.

7. A host, comprising:

a processor; and a memory storing instructions operable with the processor for the host to control a dynamic transition of the host from a current operation mode to a target operation mode, the instructions executed for:

the host receiving an operation mode transition request to transition a logical representation of a storage subsystem as maintained by the host from the current operation mode to the target operation mode; and the host reconfiguring the logical representation of the storage subsystem to the target operation mode based on the operation mode transition request exclusive of a reloading of initial programs by an operating system of the host, wherein the host reconfiguring the logical representation of the storage subsystem to the target operation mode based on the operation mode transition request includes:

the host quiescing each active alias I/O operation; and wherein the instructions are further executed for:

the host restarting each quiesced alias I/O operation subsequent to a completion of a reconfiguration of the logical representation of the storage subsystem to the target operation mode.

8. The host of claim 7, wherein the host receives the operation mode transition request from an operator of the host; and wherein the host reconfiguring the logical representation of the storage subsystem to the target operation mode based on the operation mode transition request includes:

the host communicating the operation mode transition request to the storage subsystem; and the host reconfiguring the logical representation of the storage subsystem to the target operation mode in response to an acknowledgement of the operation mode transition request by the storage subsystem.

9. The host of claim 7, wherein the host receives the operation mode transition request from the storage subsystem; and wherein the host reconfiguring the logical representation of the storage subsystem to the target operation mode based on the operation mode transition request further includes:

the host acknowledging the operation mode transition request from the storage subsystem in response to the host having a capability of operating in the target mode operation.

10. The host of claim 7, wherein the host reconfiguring the logical representation of the storage subsystem to the target operation mode based on the operation mode transition request includes:

the host unbinding each logical alias bounded to a base logical volume and affected by an execution of the operation mode transition request.

11. The host of claim 10, wherein the instructions are further executed for:

the host updating a logical representation of each unbound logical alias subsequent to a completion of a reconfiguration of the logical representation of the storage subsystem to the target operation mode.

12. The host of claim 7, wherein the host reconfiguring the logical representation of the storage subsystem to the target operation mode based on the operation mode transition request includes:

the host converting logical representations of a control structure of the storage subsystems and each base logical volume of the storage subsystem affected by an execution of the operation mode transition request from the current operation mode to the target operation mode.

13. A method for a host controlling a dynamic transition of the host from a current operation mode to a target operation mode, the method comprising:

the host receiving an operation mode transition request to transition a logical representation of a storage subsystem as maintained by the host from the current operation mode to the target operation mode; and the host reconfiguring the logical representation of the storage subsystem to the target operation mode based on the operation mode transition request exclusive of reloading of initial programs by an operating system of the host, wherein the host reconfiguring the logical representation of the storage subsystem to the target operation mode based on the operation mode transition request includes:

the host quiescing each active alias I/O operation; and wherein the instructions are further executed for:

the host restarting each quiesced alias I/O operation subsequent to a completion of a reconfiguration of the logical representation of the storage subsystem to the target operation mode.

14. The method of claim 13, wherein the host receives the operation mode transition request from an operator of the host; and wherein the host reconfiguring the logical representation of the storage subsystem to the target operation mode based on the operation mode transition request includes:

the host communicating the operation mode transition request to the storage subsystem; and the host reconfiguring the logical representation of the storage subsystem to the target operation mode in response to an acknowledgement of the operation mode transition request by the storage subsystem.

15. The method of claim 13, wherein the host receives the operation mode transition request from the storage subsystem; and wherein the host reconfiguring the logical representation of the storage subsystem to the target operation mode based on the operation mode transition request further includes:

the host acknowledging the operation mode transition request from the storage subsystem in response to the host having a capability of operating in the target mode operation.

16. The method of claim 13, wherein the host reconfiguring the logical representation of the storage subsystem to the target operation mode based on the operation mode transition request includes:

the host unbinding each logical alias bounded to a base logical volume and affected by an execution of the operation mode transition request.

17. The method of claim 16, further comprising:

the host updating a logical representation of each unbound logical alias subsequent to a completion of a reconfiguration of the logical representation of the storage subsystem to the target operation mode.

18. The method of claim 13, wherein the host reconfiguring the logical representation of the storage subsystem to the target operation mode based on the operation mode transition request includes:

the host converting logical representations of a control structure of the storage subsystems and each base logical volume of the storage subsystem affected by an execution of the operation mode transition request from the current operation mode to the target operation mode.

* * * * *